United States Patent
Kim et al.

(10) Patent No.: US 7,310,473 B2
(45) Date of Patent: Dec. 18, 2007

(54) OPTICAL ANTENNA AND WIRELESS OPTICAL SYSTEM USING THE SAME

(75) Inventors: Jin-Hee Kim, Suwon-si (KR); Jong-Hwa Lee, Suwon-si (KR); Ji-Eun Keum, Suwon-si (KR); Jae-Yeon Song, Seoul (KR); Se-Youn Lim, Seoul (KR); Yoon-Sun Lee, Seoul (KR); Seo-Won Kwon, Seoul (KR)

(73) Assignee: Samsung Electronics Co., Ltd., Maetan-Dong, Yeong Tong-Gu, Suwon-Si, Gyeonggi-Do (KR)

( * ) Notice: Subject to any disclaimer, the term of this patent is extended or adjusted under 35 U.S.C. 154(b) by 678 days.

(21) Appl. No.: 10/894,937

(22) Filed: Jul. 20, 2004

(65) Prior Publication Data

US 2005/0175363 A1    Aug. 11, 2005

(30) Foreign Application Priority Data

Jan. 28, 2004    (KR)    ............ 10-2004-0005515

(51) Int. Cl.
*G02B 6/10* (2006.01)
(52) U.S. Cl. .............. 385/147; 398/212; 359/652; 359/653; 359/742; 250/216; 250/227.11
(58) Field of Classification Search ............ 385/146; 398/212; 359/652, 653, 742
See application file for complete search history.

(56) References Cited

U.S. PATENT DOCUMENTS 5,200,858 A    4/1993    Hagerty et al. ............ 359/652

| | | | | |
|---|---|---|---|---|
| 5,357,101 A | * | 10/1994 | Plesko | 250/216 |
| 7,009,213 B2 | * | 3/2006 | Camras et al. | 257/98 |
| 2004/0094696 A1 | * | 5/2004 | Ramirez-Iniguez et al. | 250/216 |
| 2005/0007675 A1 | * | 1/2005 | Matsumoto et al. | 359/652 |
| 2006/0262399 A1 | * | 11/2006 | Green et al. | 359/487 |

FOREIGN PATENT DOCUMENTS

| | | |
|---|---|---|
| EP | 0278408 | 2/1988 |
| EP | 0875724 | 11/1998 |
| EP | 0875724 A2 | 11/1998 |
| JP | 07-245587 | 9/1995 |
| JP | 08-234031 | 9/1996 |
| WO | WO 89/01640 | 2/1989 |
| WO | WO 02/21734 | 3/2002 |
| WO | WO 02/21734 A1 | 3/2002 |

OTHER PUBLICATIONS

X. Ning et al.; "Dielectric Totally Internally Reflecting Concentrators;" Applied Optics, Optical Society of America, Washington; Jan. 15, 1987; XP 00212726; 6 pgs.

* cited by examiner

Primary Examiner—Frank G. Font
Assistant Examiner—James P. Hughes
(74) Attorney, Agent, or Firm—Cha & Reiter, LLC

(57) ABSTRACT

A light concentrator for an optical antenna gradually narrows from the light receiving end to the end in contact with a light detector, and has a refractive index that gradually increases from the first to the second end, to afford a greater acceptance angle for the incoming optical signal. The increase may occur in stages of corresponding layers of the light concentrator, the layers being arranged in order of increase in refractive index from the first end to the second end.

20 Claims, 5 Drawing Sheets

US 7,310,473 B2

OPTICAL ANTENNA AND WIRELESS OPTICAL SYSTEM USING THE SAME

CLAIM OF PRIORITY

This application claims priority under 35 U.S.C. § 119 to an application entitled "Optical Antenna and Wireless Optical System Using the Same," filed in the Korean Intellectual Property Office on Jan. 28, 2004 and assigned Serial No. 2004-5515, the contents of which are incorporated herein by reference.

BACKGROUND OF THE INVENTION

1. Field of the Invention

The present invention relates generally to an optical antenna, and in particular, to an optical antenna that includes an optical concentrator.

2. Description of the Related Art

A typical optical antenna includes a light concentrator in the form of a hemispherical lens. A distinctive shortcoming of this light concentrator is the limited acceptance angle range in which an optical signal is receivable.

To overcome the problem, Warwick University, U.K. proposed a trumpet-shaped light concentrator. The optical antenna is applicable to infrared wireless optical communication systems, a variety of signal processes, analog or digital systems, and portable phones. As one simple example, the optical antenna can be implemented in a wireless remote controller for home use.

FIG. 1 illustrates a conventional optical antenna 100 including a trumpet-shaped light concentrator 110, and an optical detector 120 for detecting an optical signal incident through the light concentrator 110.

Like a trumpet, the light concentrator 110 becomes narrow in width, starting from a first end 110a at which optical signals are incident to a second end 110b contacting the optical detector 120. The light concentrator 110 totally internally reflects to the optical detector 120 the optical signal incident at the first end 10a within an acceptance angle. The acceptance angle refers to an angle over which the optical detector 120 accepts an optical signal incident on the light concentrator 110. The totally internally reflected optical signal from the light concentrator 110 is applied to the input of the optical detector 120.

The optical detector 120 can be a waveguide photodiode (PD). A refraction index matching layer or a band pass filter can be inserted between the light concentrator 110 and the optical detector 120.

FIG. 2 illustrates an operational characteristic of the optical antenna depicted in FIG. 1. An optical signal incident at a larger angle than an acceptance angle is shown. Referring to FIG. 2, the input optical signal is radiated outside the optical concentrator 110 after total reflection.

In the above optical antenna, while the trumpet-shaped light concentrator offers a wider acceptance angle than the hemispherical lens, any incoming optical signal beyond the acceptance angle is re-reflected outside.

SUMMARY OF THE INVENTION

An object of the present invention is to substantially solve at least the above problems and/or disadvantages and to provide at least the advantages below. Accordingly, an object of the present invention is to provide an optical antenna structure that offers a wide acceptance angle range.

The above object is achieved by providing a light concentrator, an optical antenna using the same, and a wireless optical system using the antenna. A light concentrator has a first end for receiving an external optical signal and a second end in contact with an optical detector for detecting the optical signal. The concentrator has a refractive index and a width. The width decreases, and the refractive index increases, from the first end to the second end.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention are described below with reference to the accompanying drawings. In the following description, well-known functions or constructions are omitted for clarity of presentation.

Figure 1:
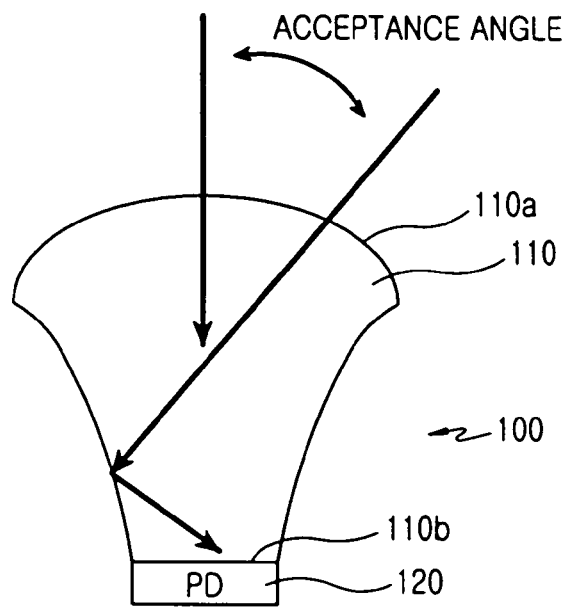
FIG. 1 is a side view of a conventional optical antenna structure.
Figure 2:
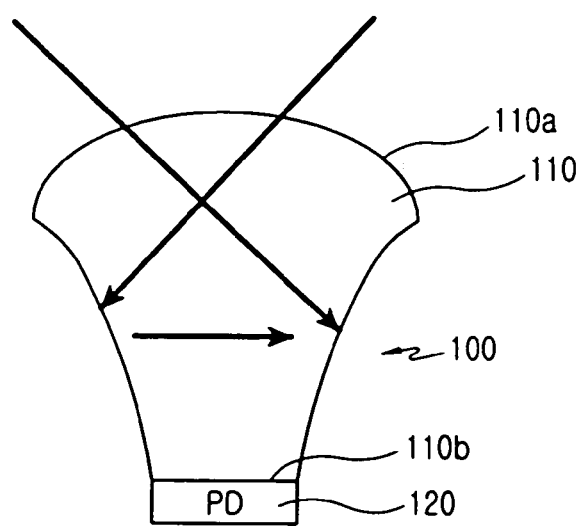
FIG. 2 is the side view of FIG. 1 that illustrates an operational characteristic of the optical antenna.
Figure 3:
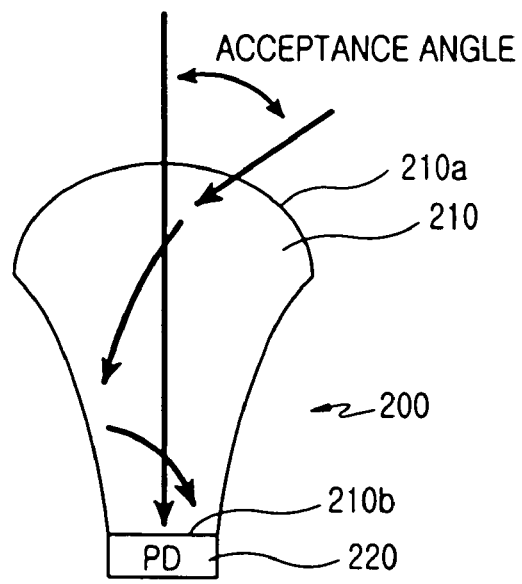
FIG. 3 is a side view of an optical antenna including a light concentrator according to an embodiment of the present invention.

FIG. 3 presents, by way of illustrative and non-limitative example, an optical antenna 200 that includes an optical detector 220 for detecting an optical signal and a light concentrator 210 whose width becomes narrow, starting from a first end 210a to a second end 210b, in accordance with the present invention. The first end 210a receives the optical signal and the second end 210b is in contact with the optical detector 220. An active layer (not shown) for detecting the optical signal may include a waveguide PD in contact with the second end 210b of the light concentrator 210.

The light concentrator 210 has, as seen in FIG. 3, a plurality of refractive index layers 211-1 to 211-n having refractive indexes that increase, starting from the first end 210a to the second end 210b. An optical signal incident on the light concentrator 210 is therefore refracted gradually via the refractive index layers 211-1 to 211-n as the signal travels toward the optical detector 220. Specifically, light traveling through the air, for example, is refracted upon entering the layer 211-1. That refracted light is again refracted upon entering layer 211-2, and so on.

Figure 5:
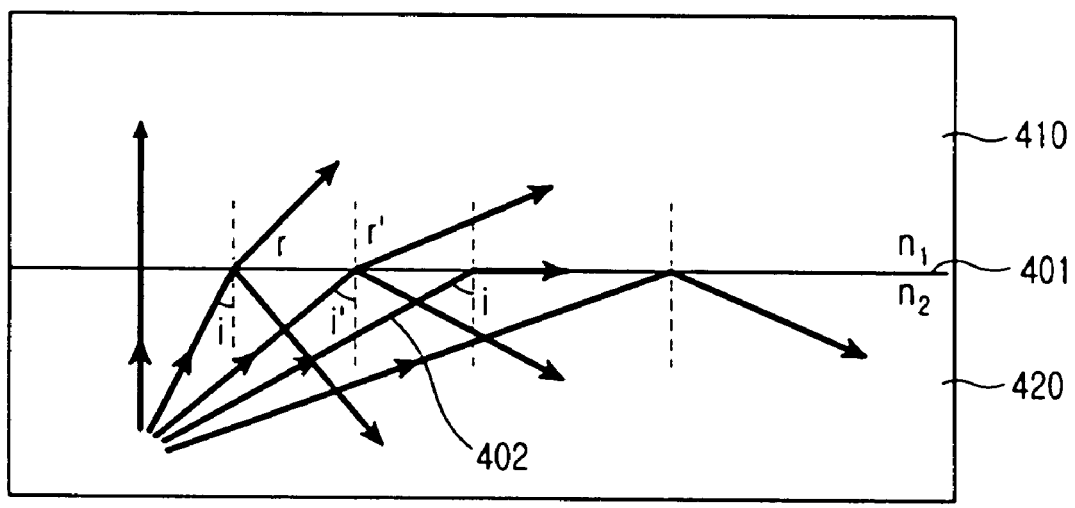
FIG. 5 is a graph illustrating the total reflection characteristics of the optical antenna illustrated in FIG. 3.

FIG. 5 demonstrates the total reflection characteristics of the optical antenna illustrated in FIG. 3. Total reflection is a phenomenon in which as light travels from a first medium 410 ($n_1$) to a second medium 420 ($n_2$), the light is reflected at the boundary surface 401 between the first and second mediums 410, 420 without intensity loss. An axis perpendicular to the boundary surface 401 is called a normal line. The light is incident on the boundary surface 401 at an angle of i or i', from normal, and reflected from the boundary surface 401 at a reflection angle or refraction angle of r or r', from normal.

Total reflection occurs when light travels from a dense medium having a high refractive index to a less dense medium having a low refractive index, or when the light is incident on the boundary surface 401 at a larger angle than the threshold angle i'. When, as seen in FIG. 5, the angle of incidence is smaller than the threshold angle, the light is partially reflected and partially refracted. Light refracted from the sides of the concentrator 210 does not reach the photodiode 220 and thus amounts to optical loss. Advantageously, the wide acceptance angle afforded by the present invention avoids optical loss that is characteristic of the prior art.

The threshold angle i' is that incident angle at which refraction at the boundary surface 401 causes the light to then travel along the boundary surface. If the light is incident at an angle larger than the threshold angle, it is totally reflected.

The light concentrator 210, since it progressively becomes narrower, starting from the first end 210a to the second end 210b, delivers more of the entering light incident on the sides of the concentrator 210 at an incidence angle exceeding the threshold angle. This causes more of the optical signal to be totally reflected and to thus arrive at the optical detector 220 with minimal loss.

Figure 4:
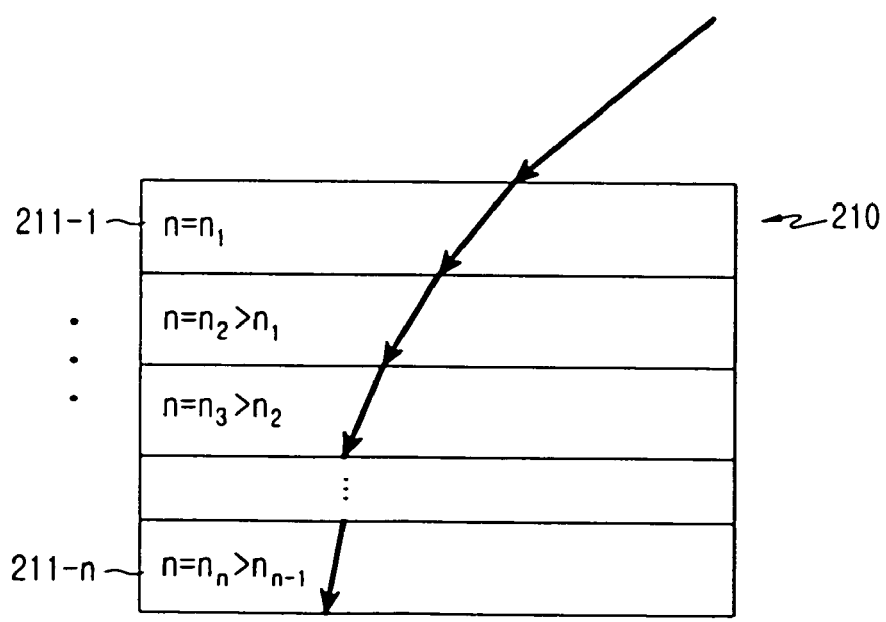
FIG. 4 is a conceptual diagram demonstrating light refraction in the embodiment of FIG. 3.
Figure 6:
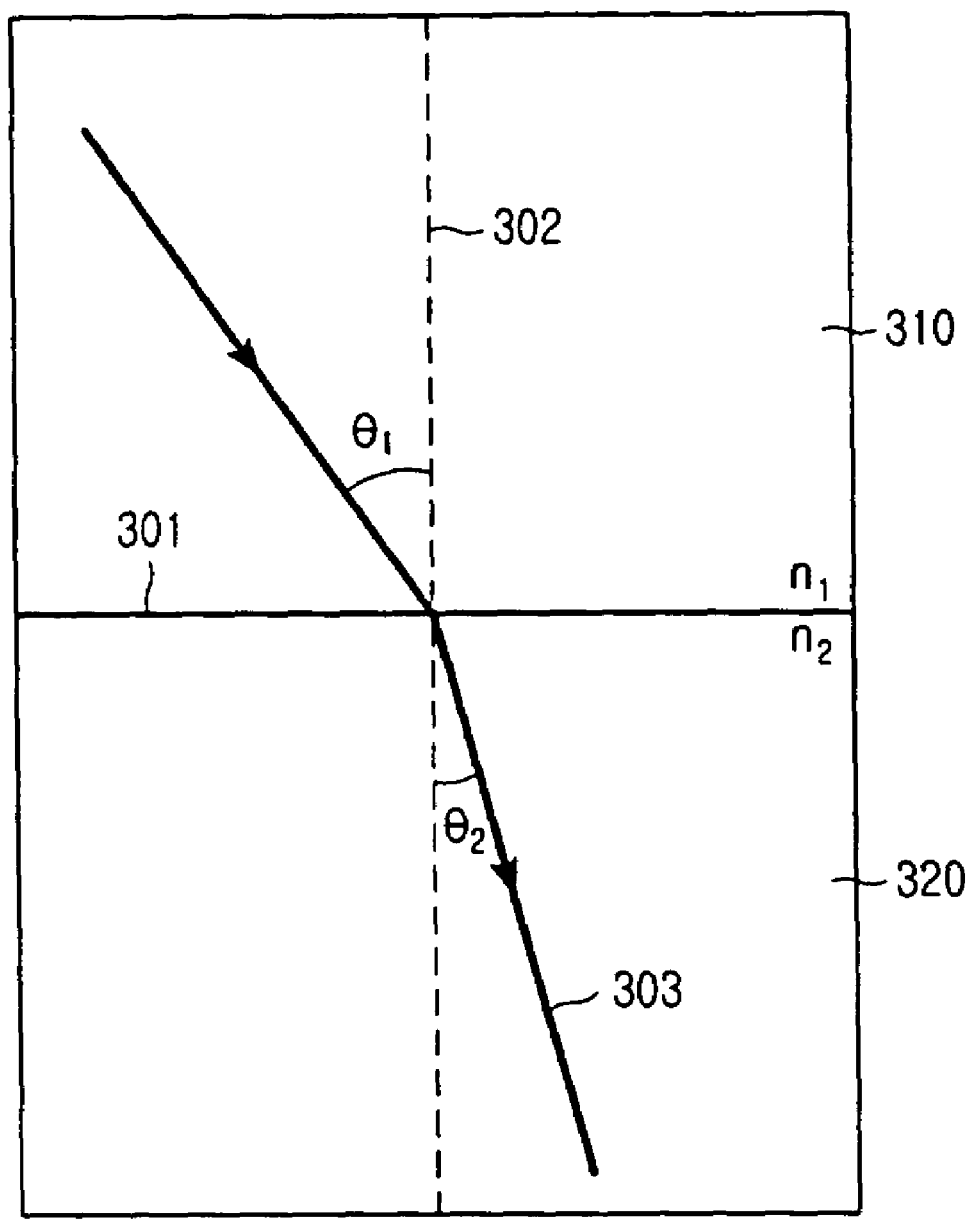
FIG. 6 is a graph illustrating the reflection characteristic of an optical signal between refractive index layers in the light concentrator illustrated in FIGS. 3 and 4.

FIG. 6 is a graph illustrating the difference in refractive index between refractive index layers in the light concentrator illustrated in FIGS. 3 and 4. As shown in FIG. 6, optical signal 303 reaches the boundary surface 301 which separates the first and second mediums 310, 320 having respectively different refractive indexes. In particular, the first medium 310 has a refractive index of $n_1$ and the second medium 320 has a refractive index of $n_2$. The optical signal travels in the first medium 310 at an angle of $\theta_1$ to a normal line 302 perpendicular to the boundary surface 301 and is refracted into the second medium 320 at an angle of $\theta_2$ from normal.

According to the Snell's law, $\theta_1$, $\theta_2$, and the refractive indexes of the first and second mediums 310 and 320 relate as follows:

$$\frac{\sin\theta_1}{\sin\theta_2} = \frac{n_2}{n_1} \quad (1)$$

Because the light concentrator 210 becomes gradually narrower, starting from the first end 210a to the second end 210b, and includes the refractive index layers 211-1 to 211-n having refractive indexes that respectively increase, starting from the first end 210a to the second end 210b, an incoming signal is successively refracted into near perpendicularity with respect to the incident or "boundary" surface of the optical detector 220.

The degree to which the optical detector 220 detects the optical signal effectively is expressed as $$A_{\text{eff}}^{\text{bare}}(\psi) = A\cos(\psi),\ 0 < \psi < \pi/2 \quad (2)$$

$$A_{\text{eff}}^{\text{bare}}(\psi) = 0,\ \psi > \pi/2 \quad (3)$$

where $$A_{\text{eff}}^{\text{bare}}(\psi)$$

denotes effective area and constitutes a measure of effective efficiency for optical signal detection in the optical detector 220. $\psi$ denotes the incident angle to the boundary surface of the optical detector 220.

Referring to equations (2) and (3), as the incidence of the optical signal on the active layer of the optical detector 220 approaches perpendicularity, the effective area increases.

By contrast, at the other extreme, if the incident angle is 90 degrees, i.e., the optical signal is incident in parallel to the active layer of the optical detector 220, the effective area is 0 according to equation (3) and thus the effective efficiency of the optical detector 220 is lowest.

It is thus concluded that the optical detector 220 achieves a maximum effective efficiency when the incident angle of the optical signal is 90 degrees to the boundary surface.

Referring to FIG. 6 and equations (1), (2) and (3), $\psi$ is $\theta_1$ or $\theta_2$ when the optical signal travels in the first or second medium 310 or 320. The refractive indices of the layers 211-1 to 211-n increase with nearness to the second end 210b. Thus, the optical signal incident on the light concentrator 210 is refracted at successively decreasing angles to the normal line. Accordingly, since the angle of the optical signal to the boundary surface between the optical detector 220 and the light concentrator 210 gradually increases, i.e., gradually decreasing the refraction angle of the optical signal to the normal line, the effective efficiency of the optical detector 220 is maximized.

Figure 7:
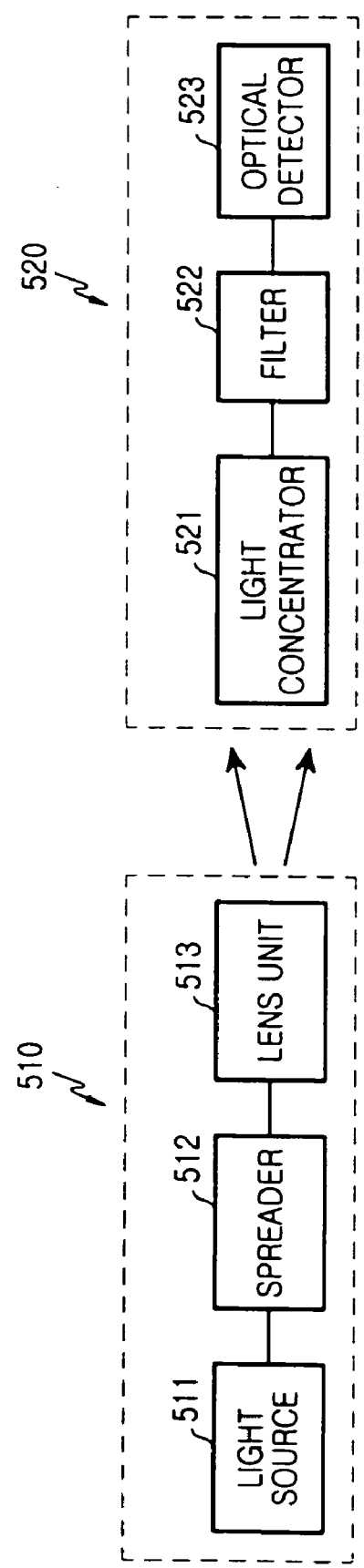
FIG. 7 is a block diagram of a wireless optical system according to another embodiment of the present invention.

FIG. 7 is a block diagram of an exemplary wireless optical system according to another embodiment of the present invention. The wireless optical system comprises an optical transmitter 510 for transmitting an optical signal and an optical receiver 520 for detecting the optical signal.

The optical transmitter 510 includes a light source 511 for generating the optical signal, and a spreader 512 and a lens unit 513 for spreading the optical signal. The optical signal generated from the light source 511 is spread by the spreader 512 and the lens unit 513 and output to the optical receiver 520.

The optical receiver 520 includes an optical detector 523 for detecting the optical signal, a light concentrator 521, and a filter 522 between the light concentrator 521 and the optical detector 523. Thus, the optical receiver 520 functions as an optical antenna for detecting the optical signal received from the optical transmitter 510.

The light concentrator 521 decreases in width, starting from the first end, at which the optical signal is received, to the second end, in contact with the optical detector 523, and increases in refractive index from the first end to the second end.

The filter 522 between the light concentrator 521 and the optical detector 523 passes to the optical detector 523 only an optical signal at a predetermined wavelength.

The wireless optical system having the above-described configuration can be used in wireless infrared communication systems and various wireless optical communication applications.

In accordance with the present invention as described above, a light concentrator in an optical antenna narrows from a first, light entry, end to a second end, and has a refractive index that increases from the first to the second end. Thus, the optical antenna offers a wider acceptance angle for the optical signal input at the first end of the light concentrator.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An optical antenna for detecting an external optical signal, comprising:
   an optical detector for detecting the optical signal; and
   a light concentrator having a refractive index, a width, a first end for receiving the optical signal, and a second end in contact with the optical detector, said width decreasing, and said refractive index increasing, from the first end to the second end.

2. The optical antenna of claim 1, wherein the optical detector includes a waveguide photodiode.

3. The optical antenna of claim 1, wherein the optical detector has an active region, said second end being in contact with the active region.

4. The optical antenna of claim 1, wherein said increasing entails n separate stages of increase in said refractive index, said concentrator correspondingly having n layers arranged, from the first to the second end, by increasing refractive index.

5. The optical antenna of claim 4, wherein n is greater than 3.

6. The optical antenna of claim 1, wherein said decreasing tapers inwardly to define a trumpet shape for the light concentrator.

7. A communication system comprising the optical antenna of claim 1 for reception of an infrared signal.

8. The optical antenna of claim 1, further including between the light concentrator and the optical detector a filter for passing to the optical detector only an optical signal at a predetermined wavelength.

9. A wireless optical system comprising an optical transmitter for outputting an optical signal, and an optical receiver for detecting the optical signal, the optical receiver comprising the optical antenna of claim 1.

10. The wireless optical system of claim 9, wherein the optical receiver includes between the light concentrator and the optical detector a filter for passing to the optical detector only an optical signal at a predetermined wavelength.

11. The wireless optical system of claim 10, wherein the optical detector includes a waveguide photodiode.

12. The wireless optical system of claim 10, wherein the optical detector has an active region, said second end being in contact with the active region.

13. A communication system comprising the wireless optical system of claim 1 for reception of an infrared signal.

14. The wireless optical system of claim 10, wherein the transmitter comprises a light source, a lens unit, and a spreader, connected between the light source and the lens unit, for spreading light received from the light source.

15. A light concentrator having a first end for receiving an external optical signal and a second end in contact with an optical detector for detecting said optical signal, said concentrator having a refractive index and a width, said width decreasing, and said refractive index increasing, from the first end to the second end.

16. The light concentrator of claim 15, wherein said increasing entails n separate stages of increase in said refractive index, said concentrator correspondingly having n layers arranged, from the first to the second end, by increasing refractive index.

17. The light concentrator of claim 16, wherein n is greater than 3.

18. The light concentrator of claim 15, wherein said decreasing tapers inwardly to define a trumpet shape for the light concentrator.

19. A communication system comprising the light concentrator of claim 15 for reception of an infrared signal.

20. A method for detecting a transmitted optical signal, comprising the steps of:
   providing light concentrator having a first end for receiving said optical signal and a second end in contact with an optical detector for detecting said optical signal, said concentrator having a refractive index and a width, said width decreasing, and said refractive index increasing, from the first end to the second end; and
   providing, at the second end, an optical detector for said detecting.

* * * * *